Patented Nov. 29, 1949

2,489,407

UNITED STATES PATENT OFFICE 2,489,407

METHOD OF LINING CONTAINER CLOSURES

Allen B. Foye, West Bridgewater, Mass., assignor to Dewey and Almy Chemical Company, North Cambridge, Mass., a corporation of Massachusetts No Drawing. Application August 9, 1947,
Serial No. 767,836

1 Claim. (Cl. 18—59)

A considerable art and extensive manufacturing practice has been built up based upon the use of resins which are essentially insoluble in a plasticizer at room temperature but are essentially completely soluble in the same plasticizer at some elevated temperature. When such a mixture is heated, the resin dissolves in the hot plasticizer, and when the solution cools, a permanent gel is formed. In the plastics industry such compositions are called "pastes." A variety of pastes have appeared on the market which are mixtures of small, solid particles of resin and a liquid plasticizer. Pastes have found wide use as troweling compounds, as tank linings, as coatings and finishes for fabrics and leathers and sometimes for dipping compositions.

The operation of placing a sealing composition in a container closure is known as "lining." The lining ultimately becomes the gasket between the glass or metal parts of the container and is the effective sealing element of the container. Linings are applied on lining machines, which essentially consist of a revolving chuck that receives the metal or glass closure part and spins it beneath a nozzle through which a liquid compound is flowed onto the closure.

Cap lining machines today operate, e. g., on one-piece metallic caps 63 mm. in diameter (the conventional closure used on coffee, jam and pickle jars) by applying approximately 1800 mg. of a liquid composition adjacent the periphery of the cap as the cap revolves. Approximately 90 caps a minute are produced from each chuck, and the chuck revolves at 250 R. P. M. After the liquid composition has been applied, the lined caps are rotated for ¼ second and then pass through a "dryer," where the water or solvent which ordinarily represents 45% of the volume of the liquid compound is evaporated. The closures must remain in the dryer for about 2 hours before the solvent or water is thoroughly expelled from the lining. A dried gasket which is formed in this manner weighs, in a 63 mm. cap, approximately 1200 mg. and occupies approximately 55% of the volume which was originally occupied by the liquid compound.

Paste compounds, on the other hand, contain no material which must be removed by evaporation or drying. They merely flux and gel on cooling. They do not change in volume between the heated fluxing stage and the solid gel stage, and they do not require any prolonged period of heating. It is only necessary that the paste be raised to the fluxing temperature and then cooled, an operation which can be performed in from three minutes to a few seconds, depending upon the design of the fluxing oven.

When the attempt was made to use pastes to form thick sealing gaskets used in many types of caps for metal or glass containers, it failed for the reason that when the temperature was raised to the degree at which the resin commenced to dissolve in the plasticizer, the paste became fluid and flowed out of position. It was the inability to maintain the position of the paste on the cap which prevented the utilization of pastes in the lining art, although such compounds would, if successful, expedite the manufacturing process greatly.

I have discovered that a "paste" may be used to form the sealing gaskets of all types of caps for metal and glass containers provided that fillers are added in such amounts that the compositions, even when heated to the so-called "fluxing" temperatures, i. e., the temperature at which the resin dissolves in the plasticizer, are never liquids, but remain stiff plastic systems. Fillers are such substances as inert, finely divided inorganic solids such as metallic oxides, talc, clay, calcium carbonate, slate flour, etc., but may be organic materials such as cotton floc, wood flour, lignin, ground cork, hard rubber dust or ground thermosetting plastic waste.

In studying the behavior of the stiff, plastic compositions produced by adding fillers to a paste-forming resin-plasticizer mixture in the development of my invention, I found that, when they are forced through the nozzle of a lining machine, at first the pressure which must be applied to cause a movement of the plastic mass builds up to a material degree and thereafter the compound starts to flow by shearing along a surface closely adjacent to the interior wall of the nozzle. The material which is adjacent the axis of the nozzle remains undisturbed and is shot out of the nozzle as a solid plug. This is a special instance of the well-recognized phenomenon of "plug flow" of plastic systems. But since a cap must have a sealing element which is substantially uniform in thickness, and since an automatic cap lining machine normally applies a uniform stripe or band of liquid sealing compound adjacent the periphery of the cap, a plug or a slug of heavy compound forms a lump in the lining which, after the compound is fluxed and solidified, prevents the closure from seating properly and sometimes prevents it from fitting the container at all.

The proportion of filling material which must be added to the resin-plasticizer paste varies greatly, depending upon the specific filler. Approximately 8% (total weight of the composition) of finely divided plate form talc will produce the high plasticities which are required, whereas, a very much higher proportion of hydrous magnesium silicate or calcium carbonate is necessary to produce the requisite plasticity.

For my purpose, I prefer to use inorganic filling materials, but find that organic materials are also useful. Particularly, materials such as alpha cellulose floc and lignin impart very high plasticity to the composition with relatively low proportion of added filler.

The filler limits are set, therefore, by flow characteristics of the composition at the temperature chosen for its application to the cap and are determined by adding increasing amounts of the selected filler to the resin-plasticizer mixture, grinding the additions in a mortar, for example. The correct amount of filler to be added will have been found when a column of the composition as high as the intended thickness of the lining resists all flow and sag when heated to the fluxing temperature. These compositions will exhibit cold flow as a long time effect. Accordingly, the words "resistant to flow or sag," or "exhibiting no flow or sag," and like expressions in the specification and claim mean that in the time involved in the operation described (lining, fluxing, etc.) the flow or sagging of the composition is and remains insignificant.

I have found that, by greatly increasing the speed at which the chuck rotates the cap beneath the nozzle as the cap is being lined, a radial thrust is produced on the composition of sufficient magnitude to overcome the greatly increased yield values which I have imparted by the addition of the fillers, and that this thrust will smooth out the lump or lap which is formed by the plug-flow characteristic of the material as it passes through the nozzle.

Using a 63 mm. cap as an example, a force of about 8.2 times gravity will be developed if the chuck rotates at 500 R. P. M. This force is amply sufficient to smooth out a lumpy band into a uniform ring. Generally, I have found that a composition will not flow or sag under the force of gravity at fluxing temperature if it will withstand a force of approximately 3 times gravity at room temperature without deformation. Compositions suitable for can sealing on lining machines which exert radial thrust of 3 G. and above are shown in the following examples:

|  | Parts by Weight | | |
| --- | --- | --- | --- |
|  | A | B | C |
| STEP 1 | | | |
| Polyvinyl chloride-acetate resin (97% vinyl chloride) | 3,000 | 3,000 | |
| Polyvinyl chloride | | | 3,000 |
| Heat stabilizer for resin formulations (proprietary product) | | | 30 |
| Hydrous magnesium silicate of fibrous structure | 1,000 | | [1] 1,600 |
| Hydrous calcium silicate | | 500 | |
| STEP 2 | | | |
| 25% solution of zinc resinate in dioctyl phthalate | 216 | 216 | 210 |
| Dioctyl phthalate | [2] 3,300 | | 2,300 |
| Tricresyl phosphate | | [3] 5,000 | |
| Tributyl phosphate | 360 | | |

[1] Hold 400 parts for final adjustment of plasticity.
[2] Hold 900 parts for final adjustment of viscosity.
[3] Hold 500 parts for final adjustment of viscosity.

Manufacturing directions: Place mixtures of step 1 in an edge running mill. Add materials of step 2.

*Composition A.*—Run mill 40 minutes at 170° F. Then add stepwise 300, 200, and 400 parts of the reserved dioctyl phthalate. Mill between each addition and finally once more until mixture is smooth and uniform.

*Composition B.*—Run mill 20 minutes at 170° F. Then reduce viscosity by adding the reserved 500 parts of tricresyl phosphate in small increments. Grind until smooth and uniform.

*Composition C.*—Run mill 20 minutes at 170° F. Then add slowly with continued grinding the 400 parts fibrous magnesium silicate reserved for adjustment of plasticity. Grind until uniform.

The viscosities of the above compositions at 120° F. measured on a Brookfield viscosimeter model LV8 with five times tension spring at the stated R. P. M. were as follow:

| R. P. M. | viscosity, cps. | | |
| --- | --- | --- | --- |
|  | A | B | C |
| 60 | 19,500 | 17,000 | 45,600 |
| 30 | 26,000 | 26,000 | 69,200 |
| 12 | 41,250 | 42,000 | 137,500 |
| 6 | 62,500 | 88,000 | 240,000 |
| 3 | 96,000 | | |
| 1.5 | 160,000 | | |
| 0.6 | 325,000 | | |
| 0.3 | 650,000 | | |

Compositions A, B and C exhibit no flow when placed at the periphery of a 70 mm. one-piece cap and rotated at 250 R. P. M., the radial force in this instance being 2½ G. When rotated for one second at 336 R. P. M., radial force equalling 4.2 G., no flow is discernible. After rotating for 30 seconds, a slight flow will be noticed. At 400 R. P. M. (a force equalling 8 G.) all three compositions flow into a smooth band.

Compositions A and B may be lined on conventional cap lining machines equipped with high-pressure composition delivery apparatus. The pressure at the nozzle of composition A and B should be approximately 80 pounds. The pressure at the nozzle of composition C should be approximately 140 pounds.

My invention, therefore, makes it possible to apply gasketing compositions to all types of caps for glass and metal containers at more than twice the present lining speeds, and it reduces the time during which the cap must be further processed to produce a solid sealing gasket from approximately two hours to a maximum of five minutes.

I claim:

The method of lining container closures which includes the steps of depositing on a rotating closure a plastic composition consisting of finely divided discrete particles of a plasticity imparting filler material, a normally liquid plasticizer, and a finely divided resin which is paste-forming with the plasticizer at a temperature below the fluxing temperature of the resin-plasticizer component of the composition, said composition being capable upon being heated to the fluxing temperature of the resin-plasticizer component thereof and being followed by cooling of forming a permanent rubbery gel, and said filler material being present in the composition in such proportion that the composition will withstand a force of 3 G. without flow or displacement at temperatures up to and including said fluxing temperature but will flow at higher force values, rotating the cap and deposited composition at a temperature below said fluxing temperature and at a speed sufficient to apply to the deposited composition a force sufficiently in excess of 3 G. to smooth out irregularities therein, reducing the force applied to the smoothed, deposited composition to below 3 G. and then raising the temperature thereof to at least the fluxing temperature of the resin-plasticizer component thereof but below the decomposition temperature of the composition and finally cooling the deposited composition.

ALLEN B. FOYE.

REFERENCES CITED

The following references are of record in the file of this patent:

UNITED STATES PATENTS

| Number | Name | Date |
|---|---|---|
| 1,861,589 | Warth | June 7, 1932 |
| 2,383,604 | Leistensnider | Aug. 28, 1945 |
| 2,389,460 | Rinehart | Nov. 20, 1945 |